E. NALL.
CUTTING OR TRIMMING MACHINE.
APPLICATION FILED JUNE 17, 1916.

1,273,526.

Patented July 23, 1918.
2 SHEETS—SHEET 1.

Inventor
Edward Nall

Witness
C. W. P. Newbold by C. L. Landon
Attorney

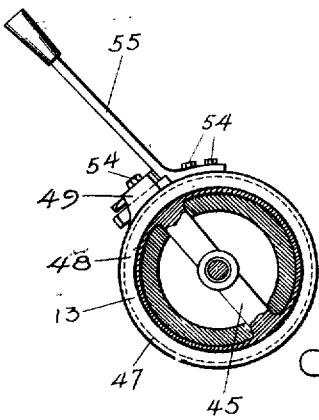
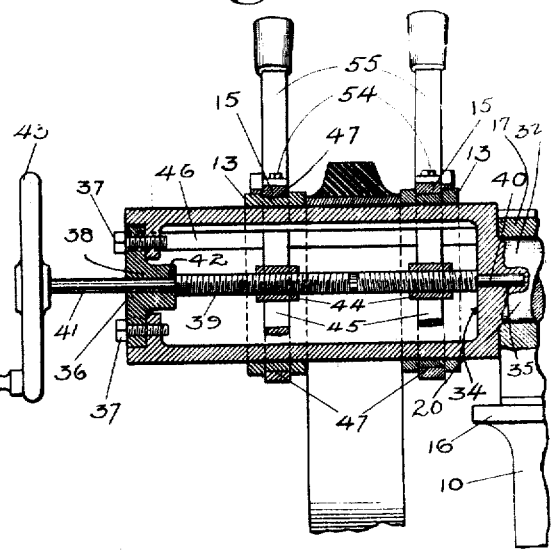
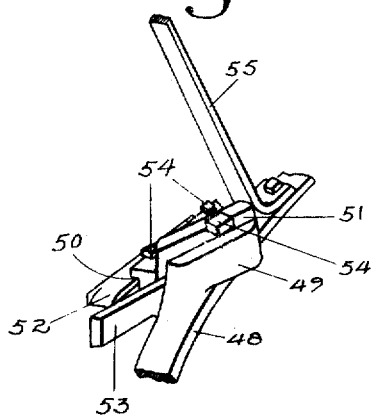
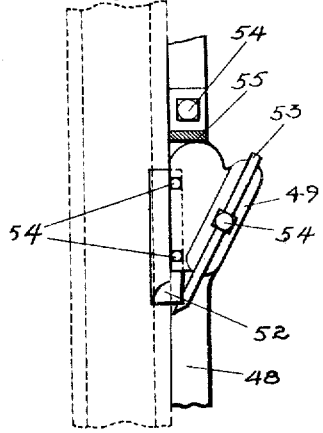
Inventor
Edward Nall.

UNITED STATES PATENT OFFICE.

EDWARD NALL, OF AKRON, OHIO, ASSIGNOR TO THE GOODYEAR TIRE AND RUBBER COMPANY, OF AKRON, OHIO, A CORPORATION OF OHIO.

CUTTING OR TRIMMING MACHINE.

1,273,346.

Specification of Letters Patent.

Patented July 23, 1918.

Application filed June 17, 1916. Serial No. 104,246.

*To all whom it may concern:*

Be it known that I, EDWARD NALL, a citizen of the United States, residing at Akron, in the county of Summit and State of Ohio, have invented new and useful Improvements in Cutting or Trimming Machines.

My present invention relates broadly to new and useful improvements to cutting or trimming machines but has particular reference to a machine of this character, which is especially adapted for trimming the overflow or "flash" from the metal base band of solid rubber tires.

In the manufacture of solid or cushion rubber tires, it is a practice of considerable extent to vulcanize the tire body upon an annular metal base band, which subsequently is mounted upon the wheel and constitutes the rim or felly thereof. In molding the rubber body upon the metallic band, a leakage or so-called overflow of the rubber usually occurs through the space between the edges of the mold and the metal band, it being impossible under economical manufacturing conditions to make the joints between the edges of the mold and the band entirely liquid tight. The result is that a relatively thin strip of overflow rubber commonly called "flash" is present on each side of the tire when it is withdrawn from the mold. This overflow strip generally occupies the space between the edges of the tire body and the edge of the base band and frequently is partially adhered to the edge of the band.

It is, therefore, one of the principal objects of the present invention to provide a trimming machine in which two sets of knives are provided to trim the overflow on each side of the tire base; the knives of each set being complementally arranged in such manner that they may simultaneously trim the overflow on the face of the base band and that which is adhered to the edges thereof.

Inasmuch as the machine must be capable of receiving and trimming tires of different sizes, it is another object of the invention to mount the sets of knives for relative adjustment in a convenient manner whereby the operator may quickly shift the two sets of knives to properly engage them with the edge portions of tires of different sizes.

A further object is to provide a novel mounting for each set of knives whereby each individual knife of each set may be adjusted independently of the other knife to effect its efficient engagement with the portion of the metal rim against which it is disposed to act.

Still another object of the invention is the provision of a relatively simple but nevertheless efficient supporting or driving mandrel upon which the tire may be placed and by which it may be turned with respect to the knives during the trimming operation.

The above and other incidental objects of a similar nature which will be hereinafter more specifically treated, may be accomplished by such means as are illustrated in the accompanying drawings, described in the following specification and then more particularly pointed out in the claims which are appended hereto and form a part of this application.

With reference to the drawings, wherein there has been illustrated a preferred embodiment of the invention as it is reduced to practice and throughout the several views of which similar reference numerals designate corresponding parts:

Fig. 3 is a section on the line 3—3 of Fig. 1;

Fig. 4 is a section on the line 4—4 of Fig. 1;

Fig. 5 is a detail view illustrating one set of knives in engagement with the edge portion of the metal base rim of the tire, the view being in front elevation; and Fig. 6 is a detail perspective of a pair of the knives mounted in the knife set which forms an integral part of a rotatable yoke.

Figure 2:
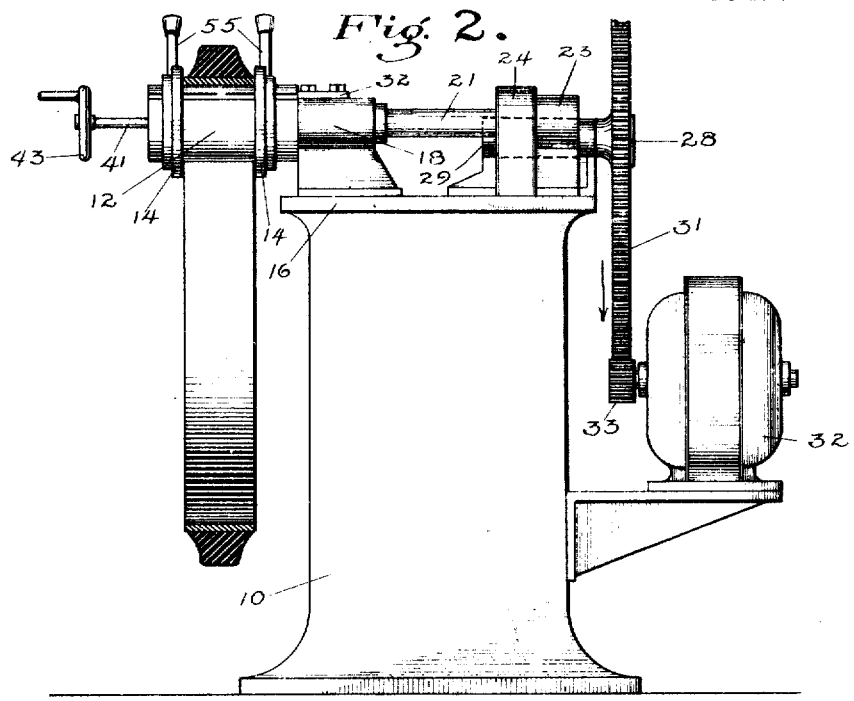
Fig. 2 is a side elevation.

A preferred embodiment of the invention such as is shown in the accompanying drawing includes as essential elements of construction a base stand 10; a pair of power driven cylinders 11 and 12, which jointly comprise the supporting and driving mandrel for the tires to be trimmed; pairs of annular guide members 13 and 14, which are respectively mounted upon the cylinders 11 and 12 and are relatively adjustable thereon for the purpose of accommodating tires of different base widths; and two sets of trimming knives which are revoluble about the guides 13 and are carried upon yokes or bands 15.

The supporting base or stand 10 may be of any conventional design but is preferably given a rectilinear, box-like, form as in Fig. 2. Upon the top slab 16 of this stand are mounted (or, if desired, integrally formed) a pair of parallel sleeve-bearings 17 and 18, which are connected by a brace plate 32 and receive the shafts 20 and 21 upon which the cylinders 11 and 12 are respectively mounted in a manner to be hereafter explained.

The rear ends of the shafts are received in bearings 22 and 23 which rise from the top of the stand. A housing 24, of sheet metal, or other material as desired, extends transversely across the top plate 16 to inclose three pinions 25, 26 and 27, the first two of which are keyed upon the shafts 20 and 21 adjacent to the rear ends thereof. The pinion 27, as shown best in Figs. 1 and 2, meshes with each of the pinions 25 and 26, is keyed upon a jack shaft 28 journaled in bearings 29 and 30 and connected at its rear end through the medium of a relatively large pinion or gear wheel 31 and a small pinion 33 of the motor shaft to the motor conventionally illustrated at 32.

Figure 1:
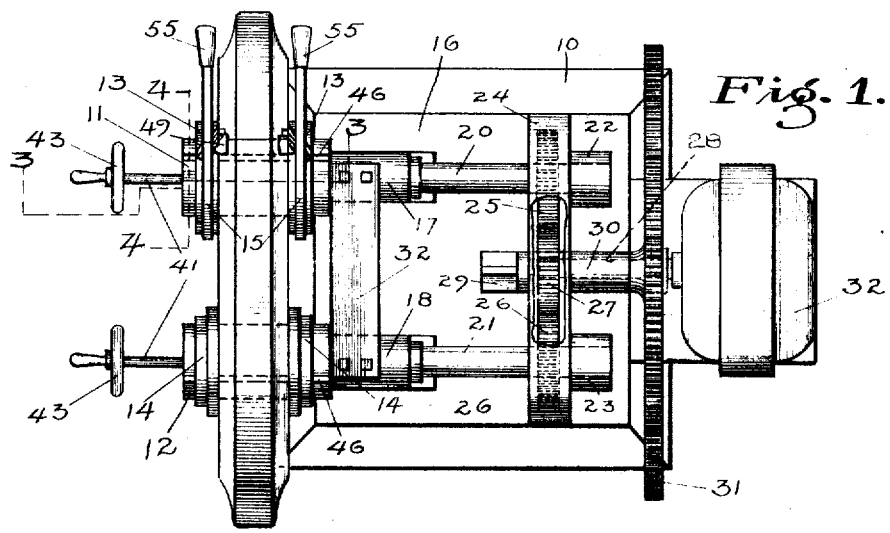
Figure 1 is a top plan view of the machine with parts thereof in operative assembled relation.

Upon joint perusal of Figs. 1 and 2, it will be seen that the motor drive will be transmitted to the two shafts 20 and 21 to rotate these members at corresponding speeds.

The cylinders 11 and 12 are either integrally formed on the outer ends of the shafts 20 and 21 as in Fig. 3 or are detachably secured to the ends of these shafts for rotation therewith. The inner end of each cylinder is closed by a wall 34 which is preferably integrally formed as in Fig. 3 and is provided in its inner face with a socket 35. The outer end of each cylinder is closed by a plate 36 which is secured by a screw or a similar fastening device 37 and is provided with a centrally located aperture 38 through which passes the screw shaft 39. The inner end of the screw shaft is in each instance reduced to provide a stud 40 which seats in the socket 35, while the outer end is also reduced to provide a stem 41 and a shoulder 42 which bears against the inner face of the plate 36. Thus, the shaft is held against longitudinal movement. To the stem 41 is detachably secured a hand wheel 43 or an equivalent operating device by which the screw shaft may be turned to adjust the guides 13 or 14 as the case may be. The guides 13 and 14 are controlled by the screw shafts through the medium of threaded sleeves 44 which are formed at the center of the spokes 45. As will be seen by reference to Figs. 3 and 4, the spokes are disposed for movement through diametrically opposed longitudinal slots 46 in the cylinders. The threaded hubs or sleeves of the guides 13 are oppositely threaded so that the turning of the screw shaft in one direction will cause the separation of the guides 13 while the turning in the other direction will cause them to approach each other. The same is true of the hubs of the guides 14.

It will now be readily apparent that the hand wheels may be conveniently manipulated to relatively adjust the guides 13 and the guides 14 to accommodate them to tires of any given base width.

The guide members 13 are each provided with a circumferential facial groove 47 wherein is received an annular band or yoke 48 having a knife receiving socket or mounting 49 as disclosed in detail in Figs. 5 and 6. Referring to these figures, it will be seen that the knife mounting is provided with two slots, 50 and 51, which receive the two knives 52 and 53 adapted to respectively operate upon the face of the base band and the side edge thereof. The slot 50 opens through the side of the mounting so that the knife may be disposed approximately tangential to the face of the base band during the trimming operation. The slot 51 opens through the top of the mounting and is disposed angularly with respect to the slot 50 so that the knife 53 may be mounted to dispose its cutting edge at an angle to the side edge of the base band. Set screws indicated at 54 may be employed in conventional manner to secure the knives in position. It is to be noted that the knives are independently adjustable so that each may be properly seated in the mounting to provide for the most effective engagement of its cutting edge with the portion of the base band against which it acts when the flash is being trimmed from the tire. A handle such as is indicated at 55 is provided for each of the knife supporting yokes so that the operator may by pulling down on the handles bring the knives into engagement with the base band as best disclosed in Figs. 3 and 4.

From the foregoing description of the structural features of the embodiment of the invention illustrated herein, the principles upon which the trimmer is adapted to operate will be understood.

The tire is slipped over the handles and is seated upon the cylinders 13 and 14. The circuit through the motor is then closed and as a result, the tire is rotated, in the direction of the arrow shown in Fig. 2, through the revolution of the cylinders. It is here to be explained that the weight of the tire and its metal base band is sufficient to effect the required traction between the cylinders and the base band. After the tire has commenced to turn, the attendant pulls down on the two handles bringing the complemental knives of each set into simultaneous engagement with the edge portions of the base band face and the side edges of the band. As the tire continues to rotate the attendant holds the handles to keep the knives against the base band so that the knives 52 trim the flash or overflow rubber from the edge portions of the face of the rim and the knives 53 from the side edges thereof.

In operation either one or the other or both of the handles 55 can be pulled down and manually held in the active position during the trimming.

In concluding the description of the present invention, it is desired to point out some of the principal advantages which flow from the specific embodiment of the invention as herein disclosed. The embodiment of two cylinders and the arranging of them so that they may jointly act as a supporting or driving mandrel eliminates the necessity of clamping the tire upon a spider or the like so that the application of tires and their removal during the use of the machine is considerably facilitated. At the same time the two cylinders provide an adequate driving means for rotating the tires in opposition to the resistance offered by the knives which must bear with considerable force upon the base band in order to completely remove the overflow of rubber therefrom. The mounting of the guides 13 and 14 for relative adjustment gives the machine a wider range of usefulness so that it may be employed in trimming tires of different base widths. The mounting of the knives of each set for independent adjustment makes it possible to keep each knife in service a greater length of time since by frequent adjustment of the knives the base bands will act as abrading elements to keep the cutting edges of the knives sharp.

In reduction to practice, it has been found that while the form of my invention, illustrated in the drawings and referred to in the above description as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

One of the principal modifications to which the present invention may be very readily subjected under some conditions is the substitution of a spider or its equivalent as a rotating support for the base band which is to be cleaned. If this substitution were made, the yokes 15, which carry the knives, could be very readily mounted upon a supporting cylinder mounted for adjustment with respect to the axis of the spider to still make possible the utilization of the machine in connection with tires of different diameters.

What I claim is:

1. A trimming machine including a revoluble support for rotating the article to be trimmed; and knife members loosely mounted upon the support and movable for engagement with the article to be trimmed on opposite sides thereof.

2. A trimming machine of the character described including a supporting structure; a revoluble member for supporting and rotating the article to be trimmed; a knife member loosely mounted upon the revoluble member and adapted to be adjusted for engagement with the article to be trimmed for removing material therefrom during rotation of the article.

3. A trimming machine of the character described including a supporting structure; a revoluble member for supporting and rotating the article to be trimmed; a knife member loosely mounted upon the revoluble member and adapted to be adjusted both longitudinally and circumferentially for engagement with the article to be trimmed for removing material therefrom during rotation of the article.

4. A trimming machine of the character described including a supporting structure; a supporting member for the article to be trimmed; a pair of knives loosely mounted on the supporting member and adapted to be adjusted longitudinally thereof whereby they may be moved into or out of engagement with the opposite edge portions of the article to be trimmed; and means for rotating said supporting member whereby the article to be trimmed may be rotated in opposition to the knives.

5. A trimming machine of the character described including a supporting structure; a pair of complemental cylinders adapted to loosely receive and to support the base band which is to be trimmed; means for simultaneously rotating the cylinders at equivalent speeds; and a pair of knives longitudinally adjustable upon one of the said cylinders and adapted to act upon opposite edge portions of the base band to be trimmed.

6. A trimming machine of the character described including a supporting structure; a pair of complemental cylinders adapted to loosely receive and to support the base band which is to be trimmed; means for simultaneously rotating the cylinders at equivalent speeds; a pair of knives longitudinally adjustable upon one of the said cylinders and adapted to act upon opposite edge portions of the base band to be trimmed; and longitudinally adjustable guide members on the other cylinder adapted to be respectively alined with the corresponding knives of the first mentioned cylinder.

7. A trimming machine of the character described including a supporting structure;

a cylinder adapted to loosely receive and support the base band to be trimmed; means for rotating the cylinder whereby the base band may be rotated during the trimming operation; a pair of trimming knives; means longitudinally adjustable upon the cylinder for loosely supporting the knives whereby the knives may be held relatively stationary during the rotation of the base band; and means for simultaneously adjusting the second mentioned means upon the supporting member for drawing the knives toward each other or separating them, whereby base bands of differing widths may be trimmed by the knives.

8. A trimming machine of the character described including a supporting structure; a cylinder adapted to loosely receive and support the base band to be trimmed; means for rotating the cylinder whereby the base band may be rotated during the trimming operation; a pair of trimming knives; means longitudinally adjustable with respect to the cylinder and supporting the knives whereby the knives may be held relatively stationary during the rotation of the base band; and means for simultaneously adjusting the second mentioned means longitudinally with respect to the cylinder for either drawing the knives toward each other or separating them, whereby base bands of differing widths may be trimmed by the knives.

9. A trimming machine of the character described including a supporting structure; a pair of parallel cylinders adapted to loosely receive and support a base band to be trimmed; means for simultaneously rotating the cylinders at equivalent speeds whereby the base band may be rotated during the trimming operation; a pair of guide members adjustable longitudinally upon one of the cylinders; means for adjusting said guides, said means being operable for drawing the guide members together or for separating them to accommodate base bands of different widths; a pair of similar guide members mounted upon the other cylinder; means for simultaneously separating or drawing together the second mentioned guide members; a set of complemental knives carried by each of the second mentioned guide members; and a knife mounting supporting each set of knives and loosely connected to a guide member and adapted to move longitudinally therewith but to remain relatively stationary during the rotation of the guide members.

10. A trimming machine of the character described including a revoluble cylinder; means to rotate said cylinder, said cylinder being adapted to loosely receive and rotate a base band to be trimmed; guide members longitudinally adjustable upon the cylinder, said guide members being adapted to bear against opposite edges of the base bands; means controlling the adjustment of the guide members and operable for simultaneously drawing them together or separating them; and a knife carried by each of said guide members, said knives being mounted for longitudinal adjustment upon the cylinder in response to the adjustment of the guide member but being free with respect to the guide members as regards rotation of the guides, whereby the knife members may be held in engagement with the base band and in relatively stationary position during the trimming of the base band.

11. A trimming machine of the character described including a supporting structure; a revoluble support adapted to receive and rotate a base band which is to be trimmed; and a set of complemental knives loosely mounted upon the supporting member for circumferential adjustment thereon whereby said knives may be swung into engagement with the opposite-edge portion of the base band for trimming the band when the same is being rotated.

12. A trimming machine of the character described including a supporting structure; a revoluble support adapted to receive and rotate a base band which is to be trimmed and a set of complemental knives loosely mounted upon the supporting member for circumferential adjustment thereon, whereby said knives may be swung into engagement with the edge portion of the base band to be trimmed, one of said knives being engageable with the outer face of the band, and the other knife being engageable with the edge of the base band.

13. A trimming machine of the character described including a supporting structure; a revoluble support adapted to receive and rotate a base band which is to be trimmed; and two sets of complemental knives loosely mounted upon the supporting member for circumferential adjustment thereon, whereby said knives may be swung into engagement with the opposite edge portion of the base band for trimming the band when the same is being rotated, each set of knives comprising one knife which is adapted to engage with the edge portion of the outer face of the base band to be trimmed and another knife which is adapted to engage with the edge of the base band; and means for independently adjusting the set of the individual knives of each set of knives.

14. A trimming machine of the character described including a supporting structure; parallel supporting cylinders revolubly mounted thereon; means for simultaneously rotating the cylinders at corresponding speeds; a pair of guide members mounted upon each cylinder; means for adjusting each pair of guide members upon its cylinder to accommodate the guides to base bands of different widths, said cylinders being adapted to loosely receive and rotate base bands which are to be trimmed; a yoke freely mounted on each guide of one of the cylinders for free circumferential movement thereon, whereby said yoke may be held relatively stationary during the rotation of the cylinder; a knife mounting formed integrally with each yoke; and a pair of trimming knives mounted in each knife mounting, each pair of knives comprising one knife which is adapted to engage with the outer face of the band to be trimmed and another knife which is engageable with the side edge of the band to be trimmed; and a handle for each yoke whereby each pair of knives may be manually swung into engagement with the edge portion of a band to be trimmed and held in trimming engagement during the rotation of the band.

15. A trimming machine of the character described including a supporting structure; a pair of parallel supporting cylinders adapted to loosely receive and support a base band to be trimmed; and a pair of knives adjustable longitudinally and circumferentially upon one of the cylinders for engagement with the side portion of the base band to be trimmed.

16. A trimming machine of the character described, including a support structure, a pair of parallel supporting cylinders adapted to loosely receive and support a base band to be trimmed, a pair of knives simultaneously adjustable upon one of said supporting cylinders and circumferentially with respect to the base band for engagement with the side portions of the base band to be trimmed, one of said knives being disposed for engagement with the outer face of the base band and the other of said knives being disposed for engagement with the edge portion of the base band.

17. A trimming machine of the character described, including a support structure, a pair of parallel supporting cylinders adapted to loosely receive and support a base band to be trimmed, a pair of knives simultaneously adjustable upon one of said supporting cylinders and circumferentially with respect to the base band for engagement with the side portions of the base band to be trimmed, one of said knives being disposed for engagement with the outer face of the base band and the other of said knives being disposed for engagement with the edge portion of the base band, and means for adjusting said pair of knives longitudinally upon the support.

18. A trimming machine including a rotatable support adapted to receive suspended thereon and rotate the annular article to be trimmed, a knife and a support therefor mounted for swinging movement with respect to the article, whereby the knife may be moved into engagement with the article for trimming the same, or disposed in inactive position spaced from said article.

19. A trimming machine including a rotatable support adapted to receive and turn the annular article to be trimmed; a pair of knives mounted for swinging movement in planes parallel to the plane of rotation of the article to be trimmed, whereby said knives may be swung into engagement with the article or disposed at inactive position; and means for adjusting the knives with respect to each other whereby articles of different widths may be accommodated between them for trimming.

20. A trimming machine including a rotatable shaft upon which an annular object to be trimmed may be mounted and by which it may be turned; a pair of knives adapted to be swung in planes parallel to the plane of rotation of the article to be trimmed, whereby said knives may be engaged with the object to be trimmed or disposed in inactive position; and means for simultaneously adjusting the said knives relative to each other by moving them toward or away from each other in paths at right angles to the plane of rotation of the article to be trimmed whereby articles of different widths may be accommodated between the knives.

21. In a machine for removing the flash from solid tire base bands, means for supporting and rotating a base band; and mechanical means mounted on the first named means for removing the flash from the edge portions thereof, said mechanical means being movable for disposal in active position wherein said means engages the base band and for disposal in inactive position wherein said means is spaced from the base band.

22. A trimming machine of the character described including a supporting structure; a revoluble support adapted to receive and rotate a base band which is to be trimmed; and a set of complemental knives loosely mounted upon the supporting member for circumferential adjustment thereon whereby said knives may be independently swung into engagement with the opposite edge portion of the base band for trimming the band when the same is being rotated.

23. A trimming machine including a rotatable support upon which an annular object to be trimmed may be mounted and by which it may be turned; a pair of knives adapted to be swung in planes parallel to the plane of rotation of the article to be trimmed, whereby said knives may either be engaged with the object to be trimmed or disposed in inactive position; and means for adjusting the said knives relative to each other by moving them toward or away from each other in paths at right angles to the plane of rotation of the article to be trimmed whereby articles of different widths may be accommodated between the knives.

24. A trimming machine including a rotatable cylindrical support adapted to receive suspended thereon and rotate an annular object to be trimmed; a pair of knives mounted for swinging movement in planes parallel to the plane of rotation of the article to be trimmed whereby said knives may be swung into engagement with the article or disposed at inactive position.

25. A trimming machine of the character described, including a supporting structure, a cylinder mounted on the structure and adapted to loosely receive and support a base band to be trimmed, means for rotating the cylinder whereby the base band may be rotated during the trimming operation; a pair of guide members mounted for simultaneous longitudinal adjustment with respect to the cylinder, said guide members being adapted to engage against the opposite edges of the base band for fixing the plane of rotation of the base band; and a knife member mounted for adjustment longitudinally with respect to the cylinder whereby the knife may be adjusted to engage with the edge portion the base band.

26. A trimming machine of the character described including a supporting structure, a revoluble cylinder mounted on the supporting structure and adapted to loosely support and to rotate a base band to be trimmed; guide members for fixing the plane of rotation of the base band and a knife mounted for adjustment longitudinally with respect to the cylinder and transversely with respect to the base band.

27. A trimming machine of the character described including a supporting structure, a revoluble cylinder mounted on the supporting structure and adapted to loosely support and rotate a base band to be trimmed; guide members for fixing the plane of rotation of the base band and a knife mounted for adjustment longitudinally with respect to the cylinder and transversely with respect to the base band, and means whereby said knife may be adjusted with respect to the axis of rotation of the base band.

28. A tire trimming machine of the character described including means for supporting and rotating a base band, a set of knives for trimming the edge portion of the base band, said set comprising two knives one of which is adapted to engage with the outer face of the base band at the edge portion thereof and the other of which is adapted to engage with the side edge of the base band; and means for simultaneously adjusting both of said knives laterally with respect to the plane of rotation of the base band.

29. A tire trimming machine of the character described including means for supporting and rotating a base band, a set of knives for trimming the edge portion of the base band, said set comprising two knives, one of which is adapted to engage with the outer face of the base band at the edge portion thereof and the other of which is adapted to engage with the side edge of the base band; and means for simultaneously adjusting both of said knives laterally with respect to the plane of rotation of the base band; and means for adjusting both of said knives with respect to the axis of rotation of the base band.

In testimony whereof I have signed my name in the presence of two subscribing witnesses.

EDWARD NALL.

Witnesses:
 LELA WAGNER,
 B. J. McDANEL.